United States Patent
Fourney et al.

(10) Patent No.: US 9,462,034 B2
(45) Date of Patent: Oct. 4, 2016

(54) AUTOMATED BIBLIOGRAPHY GENERATION

(71) Applicant: Microsoft Technology Licensing, LLC, Redmond, WA (US)

(72) Inventors: Adam Fourney, Waterloo (CA); Meredith Morris, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 13/798,974

(22) Filed: Mar. 13, 2013

(65) Prior Publication Data

US 2014/0280466 A1   Sep. 18, 2014

(51) Int. Cl.
| | |
|---|---|
| G06F 15/16 | (2006.01) |
| H04L 29/08 | (2006.01) |
| G06F 17/30 | (2006.01) |
| G06Q 30/02 | (2012.01) |

(52) U.S. Cl.
CPC ......... *H04L 67/02* (2013.01); *G06F 17/30056* (2013.01); *G06F 17/30864* (2013.01); *H04L 67/22* (2013.01); *G06Q 30/0256* (2013.01); *H04L 67/306* (2013.01)

(58) Field of Classification Search
CPC ................. G06Q 30/0256; G06F 17/30864; G06F 17/30867; G06F 17/3053; G06F 17/30554
See application file for complete search history.

(56) References Cited

U.S. PATENT DOCUMENTS

| | | | |
|---|---|---|---|
| 7,305,436 B2 | 12/2007 | Willis | |
| 7,340,685 B2 | 3/2008 | Chen et al. | |
| 8,090,740 B2 | 1/2012 | Morris et al. | |
| 2006/0224587 A1* | 10/2006 | Zamir et al. | 707/7 |
| 2008/0091684 A1 | 4/2008 | Ellis et al. | |
| 2009/0327235 A1 | 12/2009 | Coladonato et al. | |
| 2010/0030813 A1* | 2/2010 | Peyrichoux | G06F 17/3089 |
| 2010/0131898 A1* | 5/2010 | Hiraiwa | 715/818 |
| 2010/0191624 A1* | 7/2010 | Sharir | G06F 17/3089 705/30 |
| 2012/0011113 A1* | 1/2012 | Cohen | G06F 17/30864 707/723 |
| 2012/0030190 A1* | 2/2012 | Lee et al. | 707/711 |
| 2013/0110565 A1* | 5/2013 | Means et al. | 705/7.11 |
| 2013/0291126 A1* | 10/2013 | Thomson | G06F 17/30014 726/30 |

OTHER PUBLICATIONS

"Answering questions on the Support Forum", Retrieved at <<http://support.mozilla.org/en-US/kb/answering-questions-support-forum>>, Retrieved Date: Nov. 20, 2012, pp. 3.

(Continued)

*Primary Examiner* — Chirag R Patel
*Assistant Examiner* — Rachel J Hackenberg
(74) *Attorney, Agent, or Firm* — Alin Corie; Sandy Swain; Micky Minhas

(57) ABSTRACT

A request may be obtained to electronically access a first network site. A selection indicator associated with selection of a dialog display for bibliography collection may be displayed, and an indication of a device user selection of the selection indicator may be received. A recordation of accessible entities that a user device accesses may be initiated, the accessible entities including one or more second network sites, in response to receiving the indication of the selection of the selection indicator. Representations of the recorded accessible entities may be displayed, and data representing at least a portion of the recorded accessible entity accesses may be transmitted to a device that is associated with the first network site.

20 Claims, 15 Drawing Sheets

(56) References Cited

OTHER PUBLICATIONS

"Understanding the Support Center and "Questions & Answers"", Retrieved at <<http://support.desk.com/customer/portal/articles/8393-understanding-the-support-center-and-%22questions-answers%22>>, Retrieved Date: Nov. 20, 2012, pp. 7.

Adamic, et al., "Knowledge Sharing and Yahoo Answers: Everyone Knows Something", Retrieved Nov. 20, 2012 at <<http://wwwconference.org/www2008/papers/pdf/p665-adamic.pdf>>, In Proceedings of the 17th International Conference on World Wide Web (WWW 2008), Apr. 21, 2008, pp. 665-674.

Aula, et al., "Information Search and Re-access Strategies of Experienced Web Users", Retrieved Nov. 20, 2012 at <<http://www.ra.ethz.ch/cdstore/www2005/docs/p583.pdf>>, In Proceedings of the 14th International Conference on World Wide Web (WWW 2005), May 10, 2005, pp. 583-592.

Bateman, et al., "The Search Dashboard: How Reflection and Comparison Impact Search Behavior", Retrieved Nov. 20, 2012 at <<http://research.microsoft.com/pubs/162293/chi12-dashboard.pdf>>, In Proceedings of the SIGCHI Conference on Human Factors in Computing Systems (CHI '12), May 5, 2012, pp. 10.

Bhavnani, Suresh K., "Domain-Specific Search Strategies for the Effective Retrieval of Healthcare and Shopping Information", Retrieved Nov. 20, 2012 at <<http://www.skbhavnani.com/DIVA/papers/Bhavnani-CHI-2002.pdf>>, In Proceedings of the CHI Extended Abstracts on Human Factors in Computing Systems (CHI 2002), Apr. 20, 2002, pp. 610-611.

Bilenko, et al., "Mining the Search Trails of Surfing Crowds: Identifying Relevant Websites from User Activity", Retrieved Nov. 20, 2012 at <<http://www.ra.ethz.ch/CDStore/www2008/www2008.org/papers/pdf/p51-bilenko.pdf>>, In Proceedings of the 17th International Conference on World Wide Web (WWW 2008), Apr. 21, 2008, pp. 51-60.

Brandt, et al., "Example-Centric Programming: Integrating Web Search into the Development Environment", Retrieved Nov. 20, 2012 at <<http://sing.stanford.edu/cs303-sp11/papers/brandt_chi10_blueprint.pdf>>, In Proceedings of the SIGCHI Conference on Human Factors in Computing Systems (CHI 2010), Apr. 10, 2010, pp. 10.

Brandt, et al., "Two Studies of Opportunistic Programming: Interleaving Web Foraging, Learning, and Writing Code", Retrieved Nov. 20, 2012 at <<http://www.hci.iastate.edu/REU09/pub/Main/DecisionMakingProcessTracingInAugmentedReality/brandt_chi09_webuse.pdf>>, In Proceedings of the 27th International Conference on Human Factors in Computing Systems (CHI 2009), Apr. 4, 2009, pp. 10.

Broder, Andrei., "A Taxonomy of Web Search", Retrieved Nov. 20, 2012 at <<http://silverfish.iiitb.ac.in/ver0/nutch_crawled_pdfs/indexed/p3-broder.pdf>>, In ACM SIGIR Forum, vol. 36, Issue 2, Retrieved Date: Nov. 20, 2012, pp. 3-10.

Gazan, Rich., "Specialists and Synthesists in a Question Answering Community", Retrieved Nov. 20, 2012 at <<http://www2.hawaii.edu/~gazan/gazan-ASIST06.pdf>>, In Proceedings 69th Annual Meeting of the American Society for Information Science and Technology, Nov. 3, 2006, pp. 10.

Goldman, et al., "Codetrail: Connecting Source Code and Web Resources", Retrieved Nov. 20, 2012 at <<http://groups.csail.mit.edu/uid/projects/codetrail/VLHCC08-Codetrail.pdf>>, In Journal of Visual Languages and Computing, vol. 20, Issue 4, Aug. 2009, pp. 8.

Harper, et al., "Predictors of Answer Quality in Online Q&A Sites", Retrieved Nov. 20, 2012 at <<http://citeseerx.ist.psu.edu/viewdoc/download?doi=10.1.1.144.6690&rep=rep1&type=pdf>>, In Proceedings of the SIGCHI Conference on Human Factors in Computing Systems (CHI 2008), Apr. 5, 2008, pp. 10.

Hartmann, et al., "HyperSource: Bridging the Gap Between Source and Code-Related Web Sites", Retrieved Nov. 20, 2012 at <<http://www.cs.berkeley.edu/~bjoern/papers/hartmann-hypersource-chi2011.pdf>>, In Proceedings of the SIGCHI Conference on Human Factors in Computing Systems (CHI 2011), May 7, 2011, pp. 4.

Kapoun, Jim., "Teaching Undergrads WEB Evaluation: A Guide for Library Instruction", Retrieved Nov. 20, 2012 at <<http://www.ncsi.iisc.ernet.in/raja/is213/webeval/undwebev.html>>, In College and Research Library News, vol. 57, No. 7, Jul. 1998, pp. 3.

Ko, et al., "Eliciting Design Requirements for Maintenance-Oriented Ides: A Detailed Study of Corrective and Perfective Maintenance Tasks", Retrieved Nov. 20, 2012 at <<http://faculty.washington.edu/ajko/papers/Ko2005MaintenanceTasks.pdf>>, In Proceedings of the 27th International Conference on Software Engineering (ICSE'05), May 15, 2005, pp. 10.

Li, et al., "Here's What I Did: Sharing and Reusing Web Activity with ActionShot", Retrieved Nov. 20, 2012 at <<http://ianli.com/publications/2010-ianli-chi-actionshot.pdf>>, In Proceedings of the SIGCHI Conference on Human Factors in Computing Systems, Apr. 10, 2010 (CHI 2010), pp. 10.

Liu, et al., "Predicting Web Searcher Satisfaction with Existing Community-based Answers", Retrieved Nov. 20, 2012 at <<http://www.cs.cmu.edu/~dpelleg/download/sigir311-liu.pdf>>, In Proceedings of the 34th International ACM SIGIR Conference on Research and Development in Information Retrieval (SIGIR'11), Jul. 24, 2011, pp. 11.

Mamykina, et al., "Design Lessons from the Fastest Q&A Site in the West", Retrieved Nov. 20, 2012 at <<http://bid.berkeley.edu/files/papers/mamykina-stackoverflow-chi2011.pdf>>, In Proceedings of the SIGCHI Conference on Human Factors in Computing Systems (CHI 2011), May 7, 2011, pp. 10.

"MSDN Site Statistics", Retrieved at <<http://social.msdn.microsoft.com/forums/en-US/categories/>>, Retrieved Date: Nov. 20, 2012, pp. 2.

Moraveji, et al., "ClassSearch: Facilitating the Development of Web Search Skills through Social Learning", Retrieved Nov. 20, 2012 at <<http://research.microsoft.com/en-us/um/people/merrie/papers/CHI2011-ClassSearch-Moraveji.pdf>>, In Proceedings of the SIGCHI Conference on Human Factors in Computing Systems (CHI 2011), May 7, 2011, pp. 10.

Morris, et al., "SearchBar: A Search-Centric Web History for Task Resumption and Information Re-Finding", Retrieved Nov. 20, 2012 at <<http://nguyendangbinh.org/Proceedings/CHI/2008/docs/p1207.pdf>>, In Proceedings of the SIGCHI Conference on Human Factors in Computing Systems (CHI 2008), Apr. 5, 2008, pp. 1207-1216.

Schraefel, et al., "Hunter Gatherer: Interaction Support for the Creation and Management of Within-Web-Page Collections", Retrieved Nov. 20, 2012 at <<http://eprints.soton.ac.uk/25767711/p172-schraefel.pdf>>, In Proceedings of the 11th International Conference on World Wide Web (WWW 2002), May 7, 2002, pp. 172-181.

Shah, et al., "Evaluating and Predicting Answer Quality in Community QA", Retrieved Nov. 20, 2012 at <<http://citeseerx.ist.psu.edu/viewdoc/download?doi=10.1.1.190.7903&rep=rep1&type=pdf>>, In Proceedings of the 33rd International ACM SIGIR Conference on Research and Development in Information Retrieval, Jul. 19, 2010 (SIGIR'10), pp. 8.

"Stack Overflow", Retrieved at <<http://stackoverflow.com/questions>>, Retrieved Date: Nov. 20, 2012, pp. 2.

Treude, et al., "How Do Programmers Ask and Answer Questions on the Web? (NIER Track)", Retrieved Nov. 20, 2012 at <<http://www.cs.tau.ac.il/research/ohad.barzilay/publications/how-do-programmers-ask-and-answer-questions-on-the-web.pdf>>, In Proceedings of the 33rd International Conference on Software Engineering (ICSE'11), May 21, 2011, pp. 4.

"W3C Provenance Working Group", Retrieved at <<http://www.w3.org/2011/prov/wiki/Main_Page>>, Retrieved Date: Nov. 20, 2012, pp. 6.

(56) References Cited

OTHER PUBLICATIONS

White, et al., "Characterizing the Influence of Domain Expertise on Web Search Behavior", Retrieved Nov. 20, 2012 at <<http://citeseerx.ist.psu.edu/viewdoc/download?doi=10.1.1.153.2198&rep=rep1&type=pdf>>, In Proceedings of the Second ACM International Conference on Web Search and Data Mining (WSDM'09), Feb. 9, 2009, pp. 10.

Forney, et al., "Enhancing Technical Q&A Forums with CiteHistory," Retrieved Jul. 16, 2012 at <<http://research.microsoft.com/en-us/um/people/merrie/papers/citehistory_icwsm2013.pdf>>, 10 pages.

* cited by examiner

Cite History

Preview       C# - refresh (F5) eventHandler in BHO

Reference & useful pages:
- "Alternative way to detect refresh in a BHO" [social.msdn.microsoft.com]
- Search: 'bho ondocumentcomplete refresh'

[CiteHistory Record]

Copy This Text

References & useful pages:

```
<ul>
<li><a href="http://social.msdn.microsoft.com/Forums/en-US/ieextensiond
evelopment/thread/7a3a8d96-52f5-4ec0-a395-222c3dffa4b2/">"Alternative wa
y to detect refresh in a BHO"  [social.msdn.microsoft.com]</a></li>
<li><a href="http://www.bing.com/search?q=bho+ondownloadcomplete+refres
h&qs=n&form=QBRE&filt=all&pq=bho+ondownloadcomplete+refresh&sc=0-3
0&sp=-1&sk=">Bing Search: 'bho ondownloadcomplete refresh'</a></li>
</ul>

[<a href="http://bit.ly/PeYeoF">CiteHistory Record</a/>]
```

[ Copy to Clipboard ]  ← 404

Cite History

Recent Additions

C# - refresh (F5) eventHandler in BHO

☆ Alternative way to detect refresh in a BHO
☆ [Search] 'bho ondownloadcomplete refresh'

- 1 minute
- 3 visits
- 4 searches [Permalink]
- 9:18 AM

VS 2012

☆ Visual Studio Team System Category
☆ Visual Studio Express Editions Category

- 25 minutes
- 15 visits
- 0 searches [Permalink]
- 9/4/2012 c – Extract object from on hdd ole binary – Stack Overflow

☆ Handling Shell Data Transfer Scenarios
☆ c- Extract object from on hdd ole binary - Stack

- 24 minutes
- 14 visits

714 — Receive at least one relevance indication from the device user, the relevance indication indicating a relevance level of one of the displayed accessible entities 716 — Initiate the transmission of data representing at least a portion of the recorded accessible entity accesses, including a transmission of a representation of the relevance indication indicating the relevance level of the associated one of the displayed accessible entities 718 — Assign a high relevance indication to respective recorded accessible entity accesses that are associated with a most recent web search, and with a most recent page visit, as a default assignment (7B)

720 — Obtaining the indication of the request includes obtaining a web page associated with access to the first network site 722 — Initiating the display of the selection indicator associated with selection of a dialog display for bibliography collection includes initiating the display of a graphical icon indicating a user selection to initiate bibliography collection associated with a researching session, based on inserting the graphical icon in the obtained web page

FIG. 7b

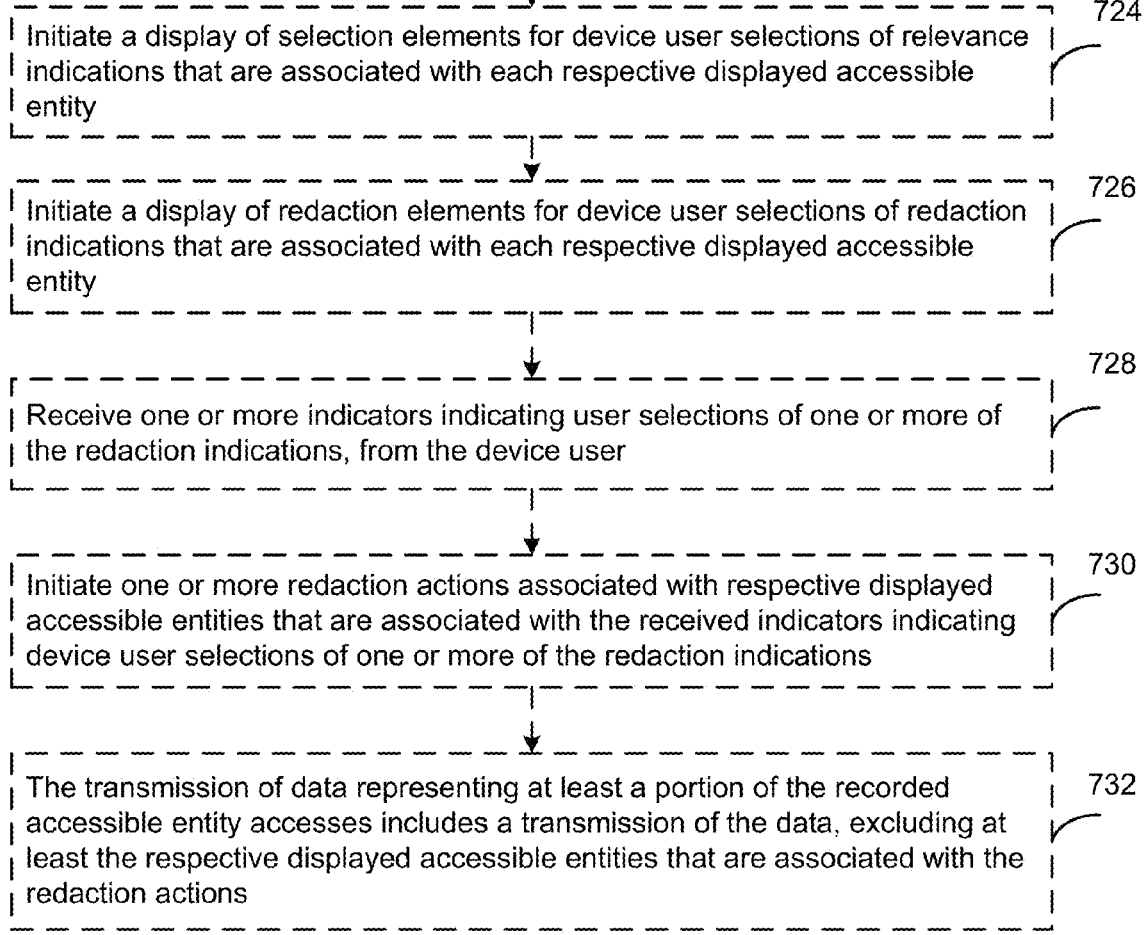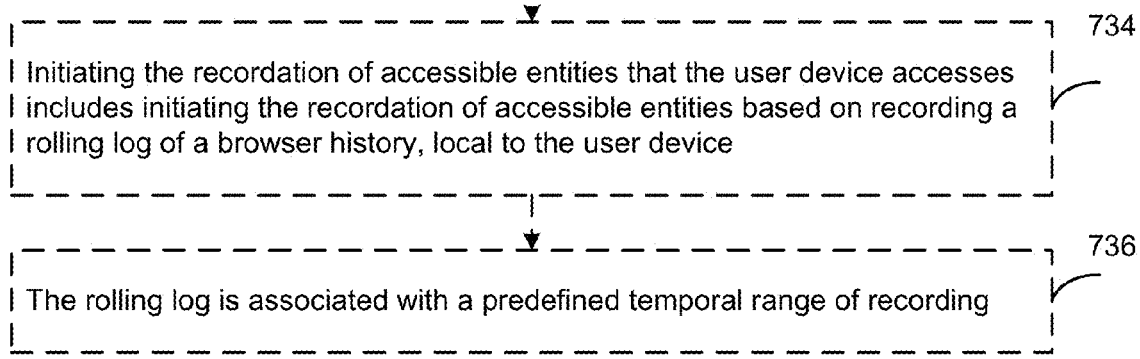
FIG. 7c

```
         ┌──┐
         │9A│                                              900b
         └┬─┘
          ▼
┌─────────────────────────────────────────────────────────┐  910
│ Receive a request for a display of a bibliography associated with one of the │
│ user posts on the first network site                    │
└─────────────────────────┬───────────────────────────────┘
                          ▼
┌─────────────────────────────────────────────────────────┐  912
│ Initiate the display of the bibliography associated with one of the user posts │
│ on the first network site, based on initiating a display of one or more of the │
│ respective sets of the recorded accessible entity accesses that are          │
│ associated with the user post on the first network site that is associated   │
│ with the request for a display of the bibliography      │
└─────────────────────────┬───────────────────────────────┘
                          ▼
┌─────────────────────────────────────────────────────────┐  914
│ Initiate a display of aggregate statistical information associated with the  │
│ display of the bibliography associated with one of the user posts on the first │
│ network site                                            │
└─────────────────────────┬───────────────────────────────┘
                          ▼
┌─────────────────────────────────────────────────────────┐  916
│ The aggregate statistical information includes one or more of a time spent   │
│ in researching that is associated with each respective bibliography, a       │
│ number of searches performed that is associated with each respective         │
│ bibliography, or a list of web pages visited during the time spent in        │
│ researching                                             │
└─────────────────────────────────────────────────────────┘

┌──┐
         │9B│
         └┬─┘
          ▼
┌─────────────────────────────────────────────────────────┐  918
│ Receive a request for a display of one or more bibliographies associated     │
│ with a first network site user that is associated with one or more of the user │
│ posts on the first network site                         │
└─────────────────────────┬───────────────────────────────┘
                          ▼
┌─────────────────────────────────────────────────────────┐  920
│ Initiate a display of the one or more bibliographies associated with the first │
│ network site user, the display including a display of public bibliographies  │
│ associated with the first network site user, and one or more non-public      │
│ bibliographies associated with the first network site user │
└─────────────────────────────────────────────────────────┘
```

FIG. 9b

AUTOMATED BIBLIOGRAPHY GENERATION

BACKGROUND

Users are increasingly using online forums, blogs, wikis, and other community-oriented sources to obtain information for many aspects of business, research, and daily life. For example, such resources have become invaluable tools to the modern knowledge worker. A recent trend in this area has involved the emergence of technical question/answer (Q&A) sites (e.g., available on networks such as the Internet), where participants can pose questions to a responsive audience of highly skilled peers. Such sites may exist for a range of disciplines, such as, for example, the software development community. For example, forums such as STACK OVERFLOW and the MICROSOFT DEVELOPER NETWORK (MSDN) have recently been reported to have hosted over 3.6 million and 7.8 million questions, respectively. Other disciplines have other Q&A sites, and many social networks (e.g., FACEBOOK) allow users to ask and answer questions, as well as research various entities. Further, researching may be involved for users posting on communication sites such as TWITTER, other sites that provide opportunities for readers to provide feedback, suggestions or questions, or blog sites.

When posting information to sites, many users may conduct research during the process of formulating their posts. For example, a user may formulate queries and conduct searches prior to posting submissions (e.g., submissions such as questions and answers, or opinions), as well as investigating other potential sources of relevant information.

SUMMARY

According to one general aspect, a system may include a bibliography collection engine that includes a site access request component that may be configured to obtain an indication of a request to electronically access a first network site. A collection start indicator component may be configured to initiate a display of a selection indicator associated with selection of a dialog display for bibliography collection, and a start indicator receiving component may be configured to receive an indication of a device user selection of the selection indicator. Further, a recordation initiation component may be configured to initiate a recordation of accessible entities that a user device accesses, the accessible entities including one or more second network sites, in response to receiving the indication of the selection of the selection indicator. Further, a recorded entity display component may be configured to initiate a display of representations of the recorded accessible entities. A recorded entity transmission component maybe configured to initiate a transmission of data representing at least a portion of the recorded accessible entity accesses to a device that is associated with the first network site.

According to another aspect, a method may include obtaining an indication of a request to electronically access a first network site. The method may further include initiating, via a device processor, a display of a selection indicator associated with selection of a dialog display for bibliography collection, and receiving an indication of a device user selection of the selection indicator. Further, a recordation of accessible entities that a user device accesses may be initiated, in response to receiving the indication of the selection of the selection indicator. The accessible entities may include one or more second network sites. Further, a display of representations of the recorded accessible entities may be initiated, and a transmission of data representing at least a portion of the recorded accessible entity accesses may be initiated, to a device that is associated with the first network site.

According to another aspect, a computer program product tangibly embodied on a computer-readable storage medium may include executable code that may cause at least one data processing apparatus to receive a plurality of transmissions of data representing at least a portion of recorded accessible entity accesses of respective associated user devices, the recorded accessible entity accesses at least associated with automated recording of browser accesses that are associated with one or more device user visits to a first network site, and represented as public bibliographies posted by respective users of the first network site. The transmitted data representing the portion of recorded accessible entity accesses may be aggregated, and a link may be associated between a plurality of user posts on the first network site and respective sets of the recorded accessible entity accesses that are associated with the respective user posts on the first network site.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 4 illustrates an example bibliography formatting view.

FIG. 5 illustrates an example view of aggregated public bibliographies provided by a forum website.

FIGS. 7a-7e are a flowchart illustrating example operations of the system of FIG. 1.

FIGS. 9a-9b are a flowchart illustrating example operations of the system of FIG. 1.

DETAILED DESCRIPTION

I. Introduction

Figure 1:
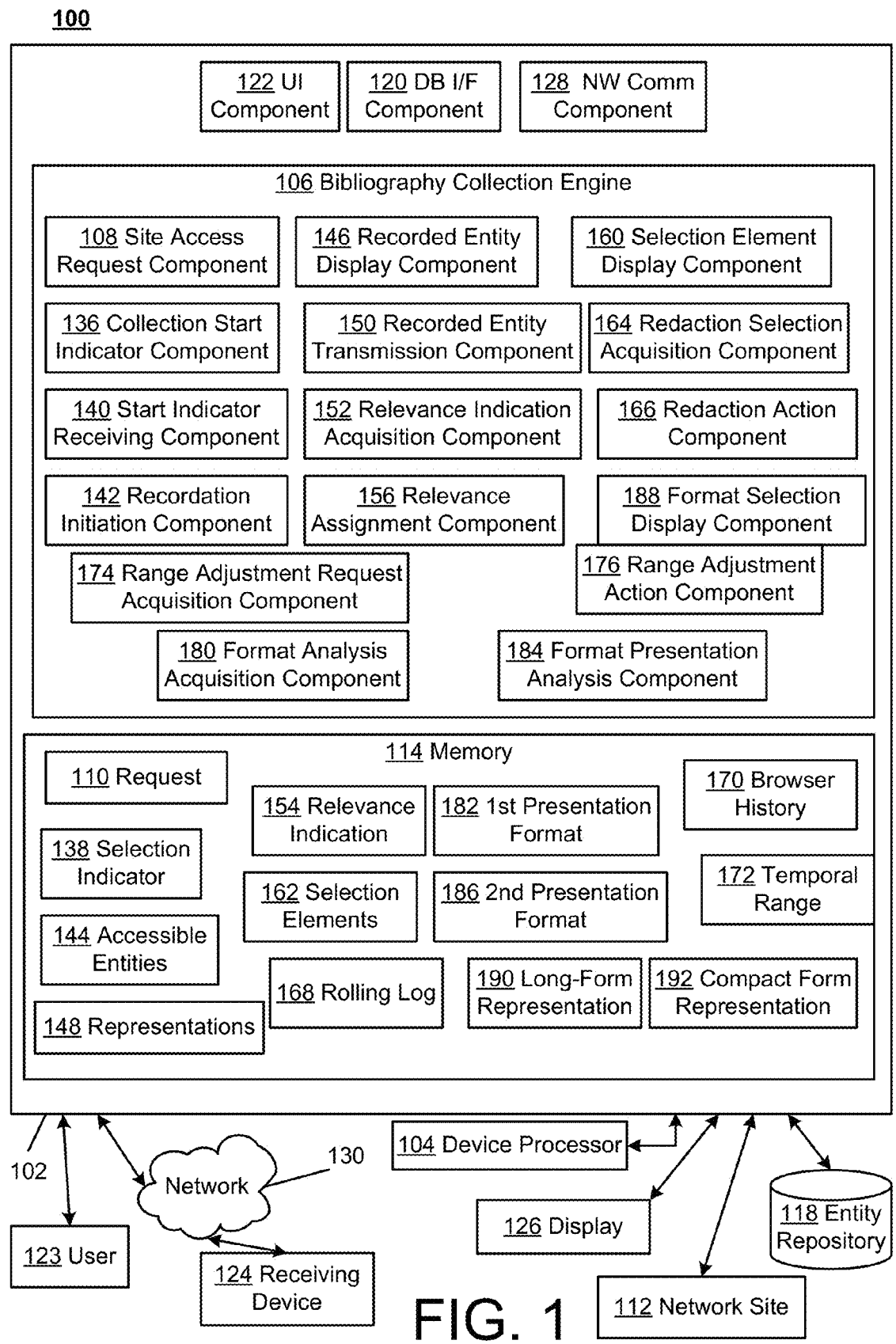
FIG. 1 is a block diagram of an example system for generating research bibliographies.

Many users conduct online research before submitting posts online. However, they may fail to include links relating to such research in their posts. Thus, other users may attempt to duplicate the poster's research to obtain more complete information for themselves, or may become frustrated in their attempts to verify the information from posts that do not include such information. Further, the readers of such posts may wish to use the posted information, with credit to be given to the most relevant source of the posted information (which may not be the user responsible for the post). For example, if a user researches one or more published articles, and then posts an answer to a question in a Q&A forum, the person who posted the question may wish to use the answer in a paper they wish to publish themselves. It is common practice to acknowledge the true source of such information, and thus the person who posted the question may wish to obtain information regarding the true source, without having to formulate their own further queries in attempts to find the originating source themselves.

In accordance with example techniques discussed herein, users may share information related to their research activities during formulations of posts, via an automated (or semi-automated) tool. For example, Q&A participants may advantageously share information related to their research activities during formulations of posts.

For example, a browser plugin (or other source, e.g., a web page in HyperText Markup Language 5 (HTML5)), as discussed herein, may simplify the process of including relevant search queries and Uniform Resource Locators (URLs) as bibliographic supplements to site posts, and may further support re-finding of information for post authors.

For example, for Q&A forum posts, posted answers may be classified as having been either written by a "synthesist" or by a "specialist." For example, synthesist answers may include those in which the author makes explicit reference to other sources of information to support their answers. Conversely, specialist answers may include those written by authors who "have proclaimed their expertise in a community, and who answer a given question without referring to any other source," as discussed by Gazan, R., "Specialists and Synthesists in a Question Answering Community," *In Proceedings of the American Society for Information Science and Technology*, Vol. 43, Issue 1 (2006), pp. 1-10. For example, forum users may tend to rate or regard "synthesist" posts more highly than "specialist" posts, or vice versa, in various types of research environments. For example, some users may feel that the number of links (e.g., URLs) included in a posted answer may positively correlate with answer quality (or vice versa).

For example, making experts' information-seeking strategies more transparent through revealing queries issued or URLs visited may be of benefit to more novice users. For example, Q&A exchanges may not merely provide information to the original asker of a question, but may be reused by subsequent searchers with similar information needs. Thus, for example, links included in answers may associate relevant reference material to user questions in cases where traditional search may fail, making such information more discoverable by novice users. Further, inclusion of links to reference material may aid readers in assessing an answer's credibility. For example, the lack of provenance information for much online content has been a topic of sufficient concern that the World Wide Web Consortium (W3C) has established a working group on that topic. Example techniques discussed herein may encourage the practice of citation inclusion (e.g., synthesist answers) by simplifying and automating (or semi-automating) users' abilities to leverage their search and browsing history when composing online posts.

In accordance with example techniques discussed herein, a system may locally record a rolling log of a user's browsing history, based on a predetermined time interval threshold value (e.g., one hour, 30 minutes, etc.) When the user visits a particular site (e.g., a forum site, a social network site, a blog site, etc.), a selection indicator (e.g., a button) may be activated on the page view of the user. By selecting the indicator, the user may be provided with a dialog that enables individuals to select and rate pages from their recent search and browsing history for inclusion in their posts.

Further, a representation of the recorded rolling browsing log (which may include all, or substantially all entities visited during a recording time interval) may be transmitted to the site sponsor for analysis. For example, for privacy, transmitted log entries may be irreversibly obscured, e.g., using a 256-bit salt and cryptographic hashing (e.g., via a SHA-256 message digest algorithm), thereby allowing coarse analysis (e.g., detecting domain or page re-visitations, counting search query terms, etc.). However, entries corresponding to the pages rated relevant by the user (e.g., via the dialog mentioned above) may escape obfuscation, and may be recorded in a readable format.

In accordance with example techniques discussed herein, a forum sponsor (e.g., a forum site, a social network site, a blog site, etc.) may aggregate public bibliographies posted by the site's users. These public records may link to their associated site posts, and list additional aggregate statistics such as the total time spent, searches performed, and pages visited while the author was researching the post.

Additionally, the site sponsor may provide a "MyCites" page where users may retrieve their private bibliographies. For example, private bibliographies may include all pages indicated by the author as being part of the research period (e.g., the time period of the rolling log discussed above), including those receiving star ratings (e.g., indicating relevance) and those not receiving stars (e.g., implicitly indicating non-relevance).

One skilled in the art of data processing will understand that there may be many ways of providing such bibliographic information, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for generating research bibliographies. As shown in FIG. 1, a system 100 may include a device 102 that includes at least one processor 104. The device 102 includes a bibliography collection engine 106 that may include a site access request component 108 that may be configured to obtain an indication of a request 110 to electronically access a first network site 112. For example, the request 110 to electronically access the site 112 may be stored in a memory 114.

For example, the bibliography collection engine 106, or one or more portions thereof, may include executable instructions that may be stored on a tangible computer-readable storage medium, as discussed below. For example, the computer-readable storage medium may include any number of storage devices, and any number of storage media types, including distributed devices.

For example, an entity repository 118 may include one or more databases, and may be accessed via a database interface component 120. One skilled in the art of data processing will appreciate that there are many techniques for storing repository information discussed herein, such as various types of database configurations (e.g., relational databases, hierarchical databases, distributed databases) and non-database configurations.

According to an example embodiment, the device 102 may include the memory 114 that may store the request 110. In this context, a "memory" may include a single memory device or multiple memory devices configured to store data and/or instructions. Further, the memory 114 may span multiple distributed storage devices.

According to an example embodiment, a user interface component 122 may manage communications between a device user 123 and the bibliography collection engine 106. The device 102 may be associated with a receiving device 124 and a display 126, and other input/output devices. For example, the display 126 may be configured to communicate with the device 102, via internal device bus communications, or via at least one network connection.

According to example embodiments, the display 126 may be implemented as a flat screen display, a print form of display, a two-dimensional display, a three-dimensional display, a static display, a moving display, sensory displays such as tactile output, audio output, and any other form of output for communicating with a user (e.g., the device user 123).

According to an example embodiment, the system 100 may include a network communication component 128 that may manage network communication between the bibliography collection engine 106 and other entities that may communicate with the bibliography collection engine 106 via at least one network 130. For example, the network 130 may include at least one of the Internet, at least one wireless network, or at least one wired network. For example, the network 130 may include a cellular network, a radio network, or any type of network that may support transmission of data for the bibliography collection engine 106. For example, the network communication component 128 may manage network communications between the bibliography collection engine 106 and the receiving device 124. For example, the network communication component 128 may manage network communication between the user interface component 122 and the receiving device 124.

In this context, a "processor" may include a single processor or multiple processors configured to process instructions associated with a processing system. A processor may thus include one or more processors processing instructions in parallel and/or in a distributed manner. Although the processor 104 is depicted as external to the bibliography collection engine 106 in FIG. 1, one skilled in the art of data processing will appreciate that the processor 104 may be implemented as a single component, and/or as distributed units which may be located internally or externally to the bibliography collection engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion. For example, the data processing apparatus may include a mobile device.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

The bibliography collection engine 106 may include a collection start indicator component 136 that may be configured to initiate a display of a selection indicator 138 associated with selection of a dialog display for bibliography collection.

Figure 2:
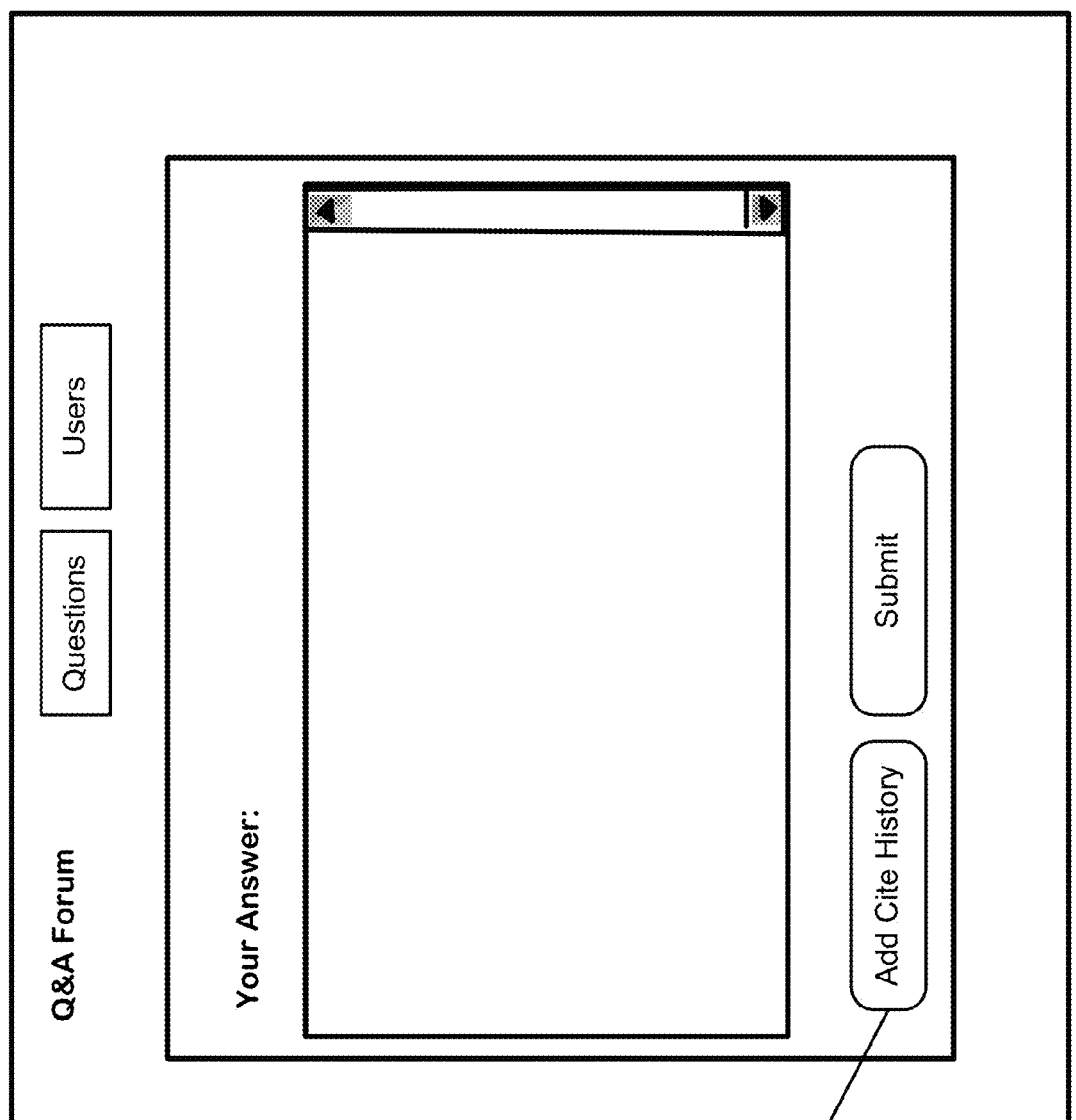
FIG. 2 illustrates an example display view of a network site page.
Figure 3:
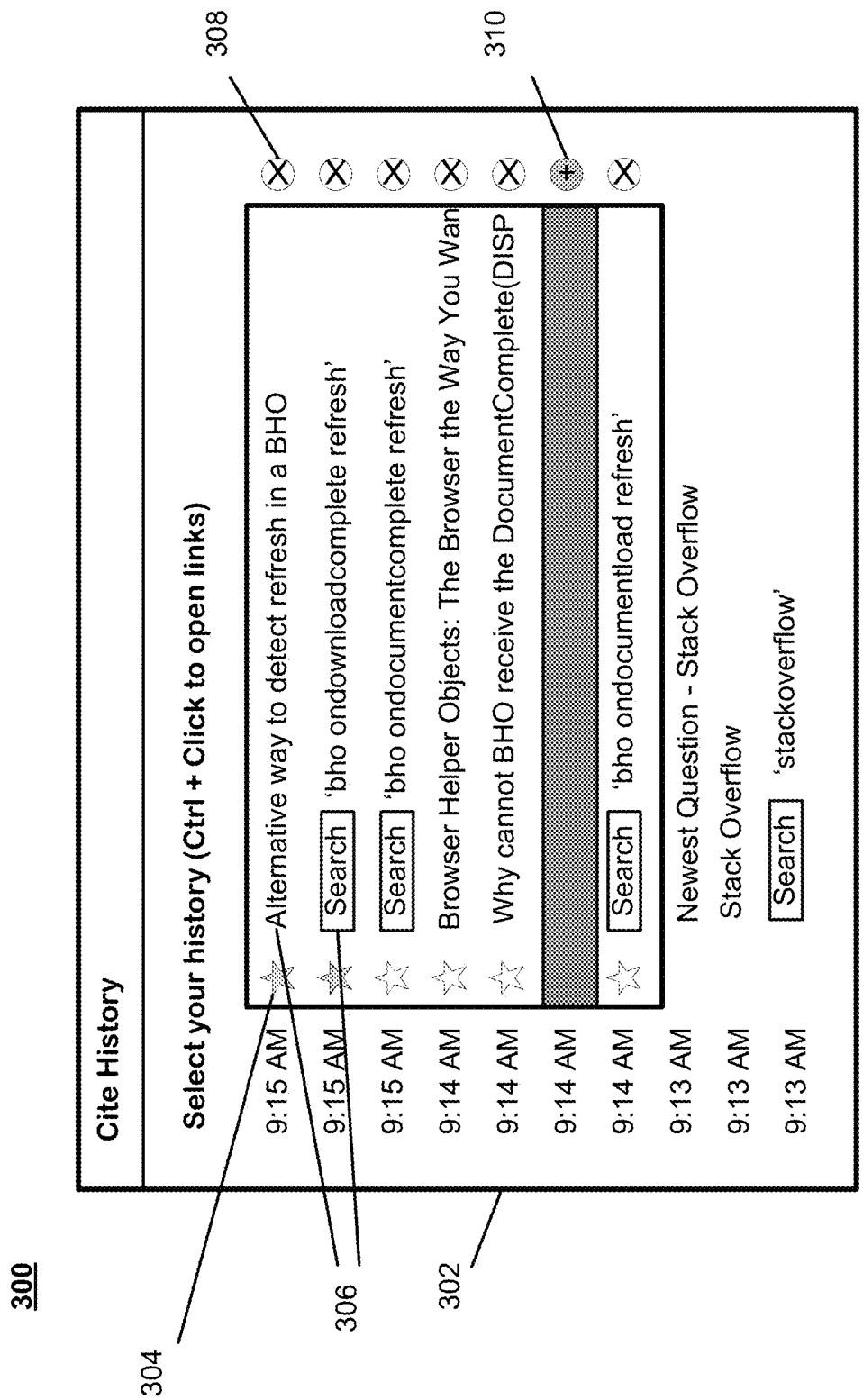
FIG. 3 illustrates an example selection dialog view.

For example, a web application may be paired with a browser plugin (e.g., for INTERNET EXPLORER, FIREFOX, CHROME, or any other browser). For example, when installed, the browser plugin may locally record a rolling log (e.g., a one-hour rolling log) of the user's browsing history. For example, when the user visits a Q&A site (e.g., the MSDN Forums or STACK EXCHANGE's websites, FACEBOOK, TWITTER, blogs, etc.), the plugin may activate and perform two actions: first, the plugin alters the HTML of the Q&A site so as to inject a new "add history" button into the page. For example, FIG. 2 illustrates a display view 200 of a Q&A Forum page, illustrating an Add Cite History button 202. Selecting (e.g., clicking) the button 202 leads to a display of a dialog that enables individuals to easily select and rate pages from their recent search and browsing history for inclusion in their posts. For example, FIG. 3 illustrates such a dialog 302.

Second, the plugin transmits a representation of the one-hour browsing log for analysis. As discussed further herein, transmitted log entries may be obscured using example cryptographic techniques. However, entries corresponding to the pages rated relevant by the user (e.g., in the first step above) may escape obfuscation, and may be recorded in a readable format. For example, the user's selections may provide explicit permission for sharing, and explicit relevance judgments for the pages in the user's browsing history.

For example, a user may visit a site, and the user may conduct online research. Prior to submitting a post, the user may select the Add Cite History button 202 (as shown in FIG. 2), and the history selection dialog 302 may be displayed (as shown in FIG. 3). For example, if the user attempts to submit the post without adding references, a prompt may be displayed, offering them the opportunity to add references.

A start indicator receiving component 140 may be configured to receive an indication of a device user selection of the selection indicator 138.

A recordation initiation component 142 may be configured to initiate a recordation of accessible entities 144 that a user device accesses, the accessible entities 144 including one or more second network sites, in response to receiving the indication of the selection of the selection indicator 138. For example, the second network sites may also include the first network site 112.

A recorded entity display component 146 may be configured to initiate a display of representations 148 of the recorded accessible entities 144.

A recorded entity transmission component 150 may be configured to initiate a transmission of data representing at least a portion of the recorded accessible entity accesses to a device that is associated with the site 112. For example, the device that is associated with the site 112 may include a hosting server associated with the device that is associated with the site 112.

For example, a relevance indication acquisition component 152 may be configured to receive at least one relevance indication 154 from the device user, the relevance indication 154 indicating a relevance level of one of the displayed accessible entities 144.

For example, the recorded entity transmission component 150 may be configured to initiate the transmission of data representing at least a portion of the recorded accessible entity accesses, including a transmission of a representation of the relevance indication 154 indicating the relevance level of the associated one of the displayed accessible entities 144.

For example, a relevance assignment component 156 may be configured to assign a high relevance indication to respective recorded accessible entity accesses that are associated with a most recent web search, and with a most recent page visit, as a default assignment.

For example, obtaining the indication of the request 110 may include obtaining a web page associated with access to the site 112.

For example, initiating the display of the selection indicator 138 associated with selection of a dialog display for bibliography collection may include initiating the display of a graphical icon indicating a user selection to initiate bibliography collection associated with a researching session, based on inserting the graphical icon in the obtained web page.

For example, a selection element display component 160 may be configured to initiate a display of selection elements 162 for device user selections of relevance indications 154 that are associated with each respective displayed accessible entity 144.

For example, the selection element display component 160 may be configured to initiate a display of redaction elements for device user selections of redaction indications that are associated with each respective displayed accessible entity 144.

For example, a redaction selection acquisition component 164 may be configured to receive one or more indicators indicating user selections of one or more of the redaction indications, from the device user. For example, a redaction action component 166 may be configured to initiate one or more redaction actions associated with respective displayed accessible entities 144 that are associated with the received indicators indicating device user selections of one or more of the redaction indications.

For example, the transmission of data representing at least a portion of the recorded accessible entity accesses may include a transmission of the data, excluding at least the respective displayed accessible entities 144 that are associated with the redaction actions.

For example, initiating the recordation of accessible entities 144 that the user device accesses may include initiating the recordation of accessible entities 144 based on recording a rolling log 168 of a browser history 170, local to the user device. For example, the rolling log 168 may be associated with a predefined temporal range 172 of recording.

For example, initiating the recordation of accessible entities 144 that the user device accesses may include initiating the recordation of accessible entities 144 when the device user initially accesses a question type of post on the site 112.

For example, a device user may wish to adjust the range of history entries that reflects the research conducted while composing his/her post to the forum site. For example, such an adjustment may be accomplished, based on dragging a selection area in the interface 300 of FIG. 3. For example, when answering a question, all pages visited after first reading the question may be initially selected. For example, a choice of default selection may be based on determination of which pages may be most helpful to the device user. For example, when a device user is asking a question, pages visited in the prior 30 minutes may be selected by default.

For example, a range adjustment request acquisition component 174 may be configured to receive an indication from the device user of a request to adjust a range of the recorded accessible entity accesses.

For example, a range adjustment action component 176 may be configured to initiate an adjustment of the range of the recorded accessible entity accesses, in response to the request to adjust the range of the recorded accessible entity accesses.

For example, the transmission of data representing at least a portion of the recorded accessible entity accesses may include a transmission of the data, excluding at least recorded accessible entity accesses that are external to the adjusted range.

For example, the indication from the device user of the request to adjust the range of the recorded accessible entity accesses may include one or more of a dragging selection indication based on a device user dragging action in a selection area of a user interface, or a text selection indication based on a device user entry of text in a selection area of a user interface.

After adjusting the time range corresponding to research, device users (e.g., authors) may then select entries to publicly include in their posts. For example, this may be accomplished by clicking on an indication such as a star icon 304 that may be displayed next to each page visit or search query, as shown in FIG. 3.

For example, by default, the most recent web search and the most recent page visit may receive a star rating (e.g., a high relevance indication as discussed above), since the endpoints of "search trails" may be likely to provide the information that the device user is seeking. For example, items in the selected time range, but not receiving the star rating, may be included in a private (e.g., non-public) bibliographic record. For example, the non-public record may be visible only to a post's author, and may also be made available to site administrators.

For example, device users may redact non-public (e.g., private) history items. For example, the device user may select a redaction indicator such as an "X" icon 308 that may be displayed next to each displayed entry 306, as shown in FIG. 3. For example, when redacted, a dark-shaded bar 310 may replace the entry. For example, redacted items may not be transmitted to the forum site, and may not appear in bibliographic records.

For example, the device user may decide to submit their selection. For example, as shown in FIG. 4, the user may then be presented, via a display 402, with a choice of a compact or long-form bibliographic record that they may be able to copy and paste into the forum post, for example, using a "copy to clipboard" 404 selection. For example, this bibliographic record may be automatically formatted in a manner that is appropriate for the forum in which the post is submitted.

For example, when presenting history entries for possible selection, the system 100 may initiate at least some parsing or interpretation of the pages/URLs so that a representation may be displayed that may be more legible to the user.

For example, an accessible entry may be represented in one format as a URL: "http://www.bing.com/search?q=microsoft+research&qs=HS&form=QBRE&filt=all &pq=microsoft+res&sc=8-13&sp=1&sk="

However, a user may have difficulty quickly comprehending what such an entry may represent. Example techniques discussed herein may provide for interpretation or parsing of the URL to recognize it as a BING search query for 'MICROSOFT RESEARCH'. This information may then be displayed in the selection area, and a different style/layout/icon may be used for the display of such an entry. Such an example display technique may aid the device user, for example, in differentiating searches from other webpage visits. For example, other presentations may include images or icons representing the pages or their contents.

For example, a format analysis acquisition component 180 may be configured to obtain at least a portion of the recorded accessible entities 144, wherein each recorded accessible entity 144 in the portion is represented in a first presentation format 182.

For example, a format presentation analysis component 184 may be configured to initiate an analysis of the recorded accessible entities 144 in the portion to determine a second presentation format 186 for a set of the recorded accessible entities 144 in the portion.

For example, initiating the display of representations of the recorded accessible entities 144 may include initiating the display of the set of the recorded accessible entities 144 in accordance with the second presentation format 186, wherein the second presentation format 186 includes a summarized version of the first presentation format 182.

For example, a format selection display component 188 may be configured to initiate a display of selectable options indicating a long-form accessible entity representation 190 and a compact form accessible entity representation 192.

For example, initiating the display of the set of the recorded accessible entities 144 in accordance with the second presentation format 186 may include initiating the display of the set of the recorded accessible entities 144 in accordance with the second presentation format 186 in response to a device user selection of the option indicating the compact form accessible entity representation 192.

While users may interact with example sites as discussed above, the example bibliographic website may provide additional functionality for the device user. For example, the site may aggregate public bibliographies posted by the site's users. For example, these public records may link to their associated site posts, and list additional aggregate statistics such as the total time spent, searches performed and pages visited while the author was researching the post. As shown in FIG. 5, the website may provide view 502 indicating features of such aggregated public records, including a "recent additions" page 500 displaying the recent additions to the aggregated public records, including statistics as discussed above. One skilled in the art of data processing that there are many different types of views that may be desirable to viewing users, as well as many different types of statistics that may be provided, without departing from the spirit of the discussion herein.

Figure 6:
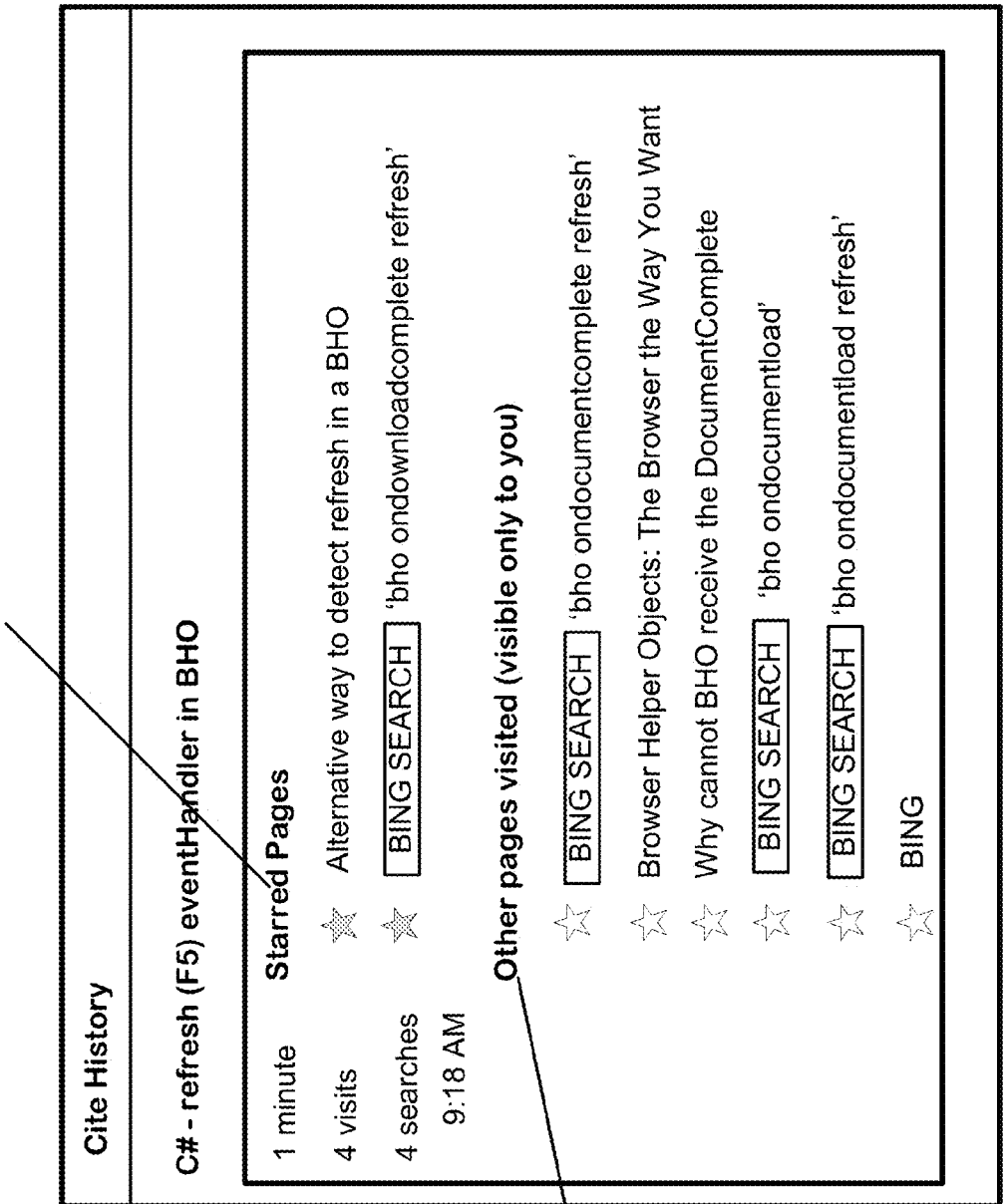
FIG. 6 illustrates an example view of bibliographies of a device user that is provided by a website.

Further, as shown in FIG. 6, the website may provide an example view 600 associated with a "MyCites" page where users may be able to retrieve their private bibliographies. As discussed above, private bibliographies may include all pages (or substantially all pages) indicated by the author as being part of the research period, including those receiving star ratings (e.g., "relevant") and those not receiving stars (e.g., "not relevant"). As shown in FIG. 6, the user's starred entries are displayed in a display area that appears as a separate area from a display area 604 that displays the user's non-starred entries.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 7A:
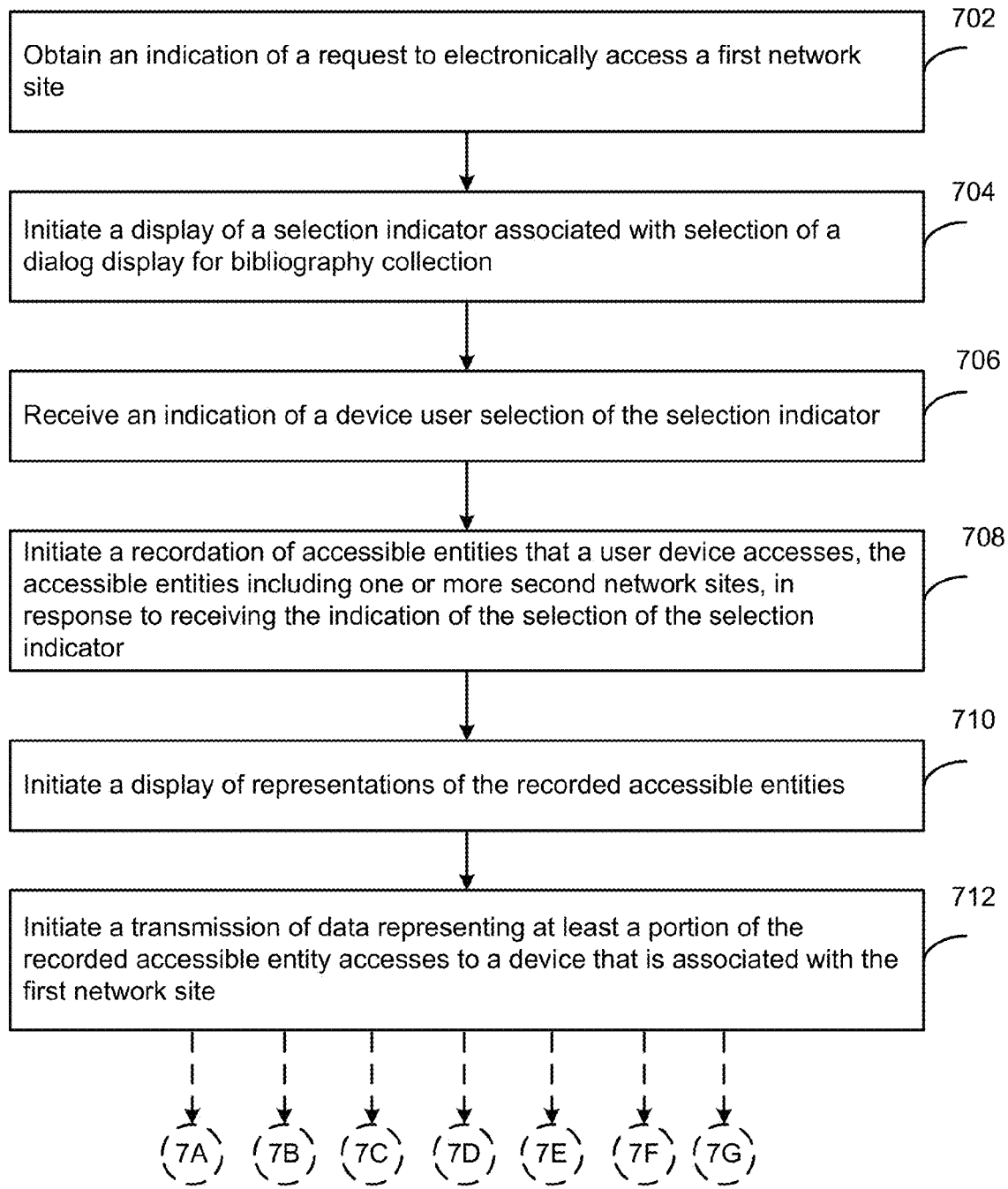

FIG. 7 is a flowchart illustrating example operations of the system of FIG. 1, according to example embodiments. In the example of FIG. 7a, an indication of a request to electronically access a first network site may be obtained (702). For example, the site access request component 108 may obtain the indication of the request 110 to electronically access the site 112, as discussed above.

A display may be initiated of a selection indicator associated with selection of a dialog display for bibliography collection (704). For example, the collection start indicator component 136 may initiate a display of a selection indicator 138 associated with selection of a dialog display for bibliography collection, as discussed above.

An indication of a device user selection of the selection indicator may be received (706). For example, the start indicator receiving component 140 may receive an indication of a device user selection of the selection indicator 138, as discussed above.

A recordation of accessible entities that a user device accesses may be initiated, the accessible entities including one or more second network sites, in response to receiving the indication of the selection of the selection indicator (708). For example, the recordation initiation component 142 may initiate a recordation of accessible entities 144 that a user device accesses, the accessible entities 144 including one or more second network sites, in response to receiving the indication of the selection of the selection indicator 138, as discussed above.

A display of representations of the recorded accessible entities may be initiated (710). For example, the recorded entity display component 146 may initiate a display of representations 148 of the recorded accessible entities 144, as discussed above. A transmission may be initiated of data representing at least a portion of the recorded accessible entity accesses to a device that is associated with the first network site (712). For example, the recorded entity transmission component 150 may initiate a transmission of data representing at least a portion of the recorded accessible entity accesses to a device that is associated with the site 112, as discussed above.

For example, at least one relevance indication may be received from the device user, the relevance indication indicating a relevance level of one of the displayed accessible entities (714), in the example of FIG. 7b. For example, the relevance indication acquisition component relevance indication acquisition component 152 may receive at least one relevance indication 154 from the device user, the relevance indication 154 indicating a relevance level of one of the displayed accessible entities 144, as discussed above.

For example, the transmission of data representing at least a portion of the recorded accessible entity accesses may include a transmission of a representation of the relevance indication indicating the relevance level of the associated one of the displayed accessible entities (716). For example, the recorded entity transmission component 150 may initiate the transmission of data representing at least a portion of the recorded accessible entity accesses, including a transmission of a representation of the relevance indication 154 indicating the relevance level of the associated one of the displayed accessible entities 144, as discussed above.

For example, a high relevance indication may be assigned to respective recorded accessible entity accesses that are associated with a most recent web search, and with a most recent page visit, as a default assignment. For example, the relevance assignment component 156 may assign a high relevance indication to respective recorded accessible entity accesses that are associated with a most recent web search, and with a most recent page visit, as a default assignment, as discussed above (718).

For example, obtaining the indication of the request may include obtaining a web page associated with access to the first network site (720).

For example, initiating the display of the selection indicator associated with selection of a dialog display for bibliography collection may include initiating the display of a graphical icon indicating a user selection to initiate bibliography collection associated with a researching session, based on inserting the graphical icon in the obtained web page (722).

For example, a display of selection elements may be initiated for device user selections of relevance indications that are associated with each respective displayed accessible entity (724), in the example of FIG. 7c. For example, the selection element display component 160 may initiate a display of selection elements 162 for device user selections of relevance indications 154 that are associated with each respective displayed accessible entity 144, as discussed above.

For example, a display may be initiated of redaction elements for device user selections of redaction indications that are associated with each respective displayed accessible entity (726). For example, the selection element display component 160 may initiate a display of redaction elements for device user selections of redaction indications that are associated with each respective displayed accessible entity 144, as discussed above.

For example, one or more indicators indicating user selections of one or more of the redaction indications may be received from the device user (728). For example, the redaction selection acquisition component 164 may receive one or more indicators indicating user selections of one or more of the redaction indications, from the device user, as discussed above.

For example, one or more redaction actions associated with respective displayed accessible entities that are associated with the received indicators indicating device user selections of one or more of the redaction indications may be initiated (730). For example, the redaction action component 166 may initiate one or more redaction actions associated with respective displayed accessible entities 144 that are associated with the received indicators indicating device user selections of one or more of the redaction indications, as discussed above.

For example, the transmission of data representing at least a portion of the recorded accessible entity accesses may include a transmission of the data, excluding at least the respective displayed accessible entities that are associated with the redaction actions (732).

For example, initiating the recordation of accessible entities that the user device accesses may include initiating the recordation of accessible entities based on recording a rolling log of a browser history, local to the user device (734).

For example, the rolling log may be associated with a predefined temporal range of recording (736).

Figure 7D:
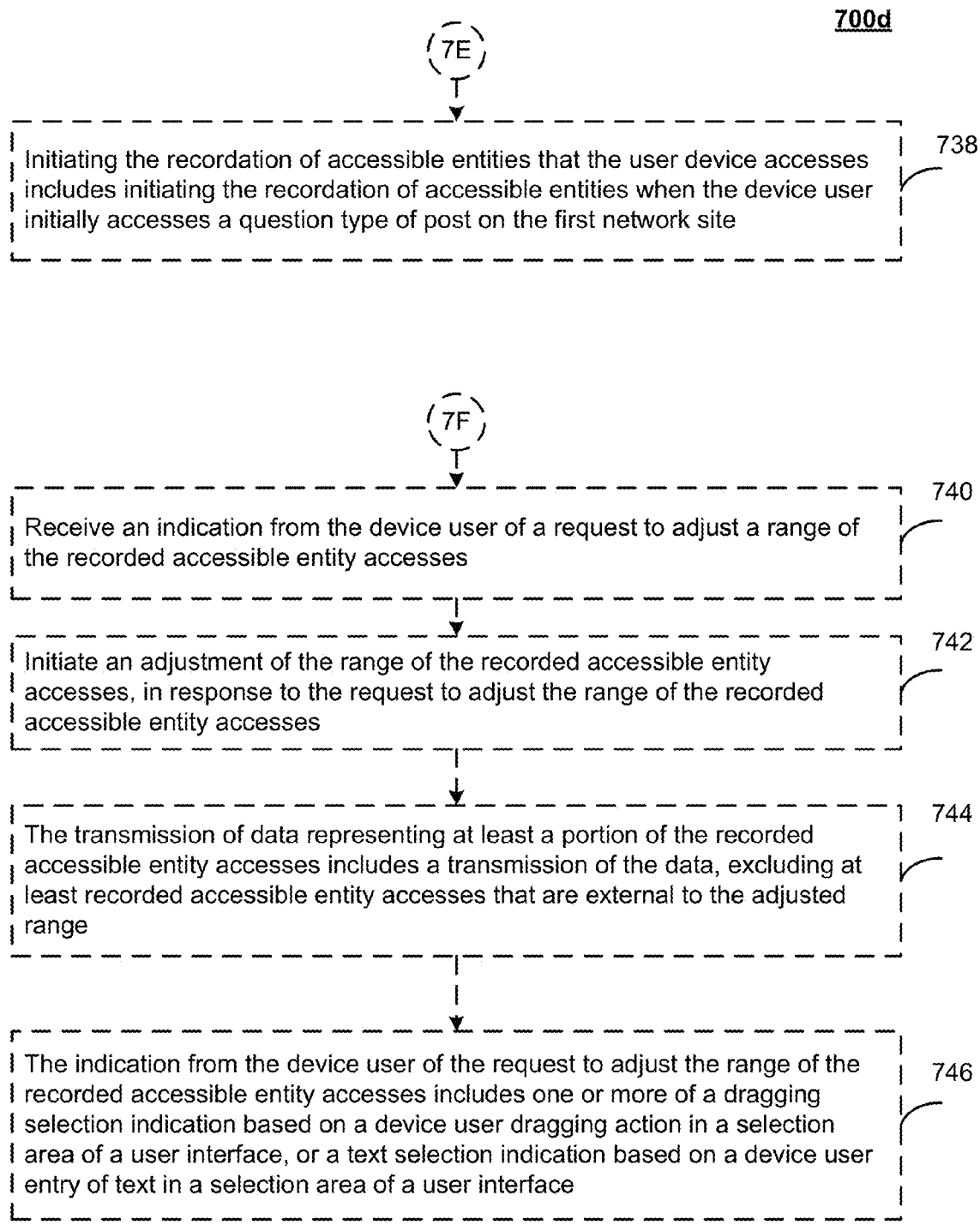

For example, initiating the recordation of accessible entities that the user device accesses may include initiating the recordation of accessible entities when the device user initially accesses a question type of post on the first network site (738), in the example of FIG. 7d.

For example, an indication may be received from the device user of a request to adjust a range of the recorded accessible entity accesses (740). For example, the range adjustment request acquisition component 174 may receive an indication from the device user of a request to adjust a range of the recorded accessible entity accesses, as discussed above.

For example, an adjustment of the range of the recorded accessible entity accesses may be initiated, in response to the request to adjust the range of the recorded accessible entity accesses (742). For example, the range adjustment action component 176 may initiate an adjustment of the range of the recorded accessible entity accesses, in response to the request to adjust the range of the recorded accessible entity accesses, as discussed above.

For example, the transmission of data representing at least a portion of the recorded accessible entity accesses may include a transmission of the data, excluding at least recorded accessible entity accesses that are external to the adjusted range (744).

For example, the indication from the device user of the request to adjust the range of the recorded accessible entity accesses may include one or more of a dragging selection indication based on a device user dragging action in a selection area of a user interface, or a text selection indication based on a device user entry of text in a selection area of a user interface (746).

Figure 7E:
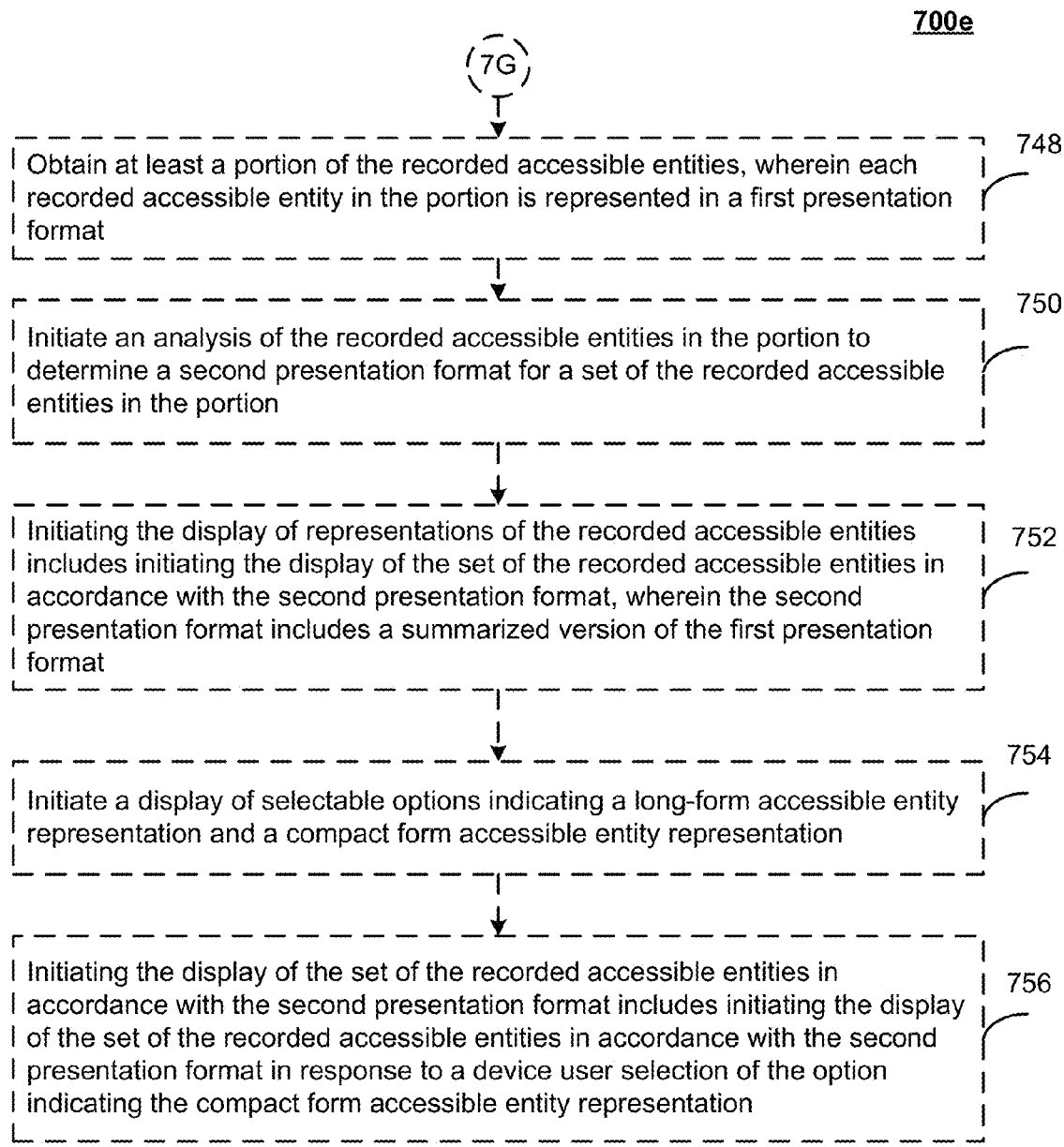

For example, at least a portion of the recorded accessible entities may be obtained, wherein each recorded accessible entity in the portion is represented in a first presentation format (748), in the example of FIG. 7e. For example, the format analysis acquisition component 180 may obtain at least a portion of the recorded accessible entities 144, wherein each recorded accessible entity 144 in the portion is represented in a first presentation format 182, as discussed above.

For example, an analysis of the recorded accessible entities in the portion may be initiated to determine a second presentation format for a set of the recorded accessible entities in the portion (750). For example, the format presentation analysis component 184 may initiate an analysis of the recorded accessible entities 144 in the portion to determine a second presentation format 186 for a set of the recorded accessible entities 144 in the portion, as discussed above.

For example, initiating the display of representations of the recorded accessible entities may include initiating the display of the set of the recorded accessible entities in accordance with the second presentation format, wherein the second presentation format includes a summarized version of the first presentation format (752).

For example, a display of selectable options indicating a long-form accessible entity representation and a compact form accessible entity representation may be initiated (754). For example, the format selection display component 188 may initiate a display of selectable options indicating a long-form accessible entity representation 190 and a compact form accessible entity representation 192, as discussed above.

For example, initiating the display of the set of the recorded accessible entities in accordance with the second presentation format may include initiating the display of the set of the recorded accessible entities in accordance with the second presentation format in response to a device user selection of the option indicating the compact form accessible entity representation (756).

Figure 8A:
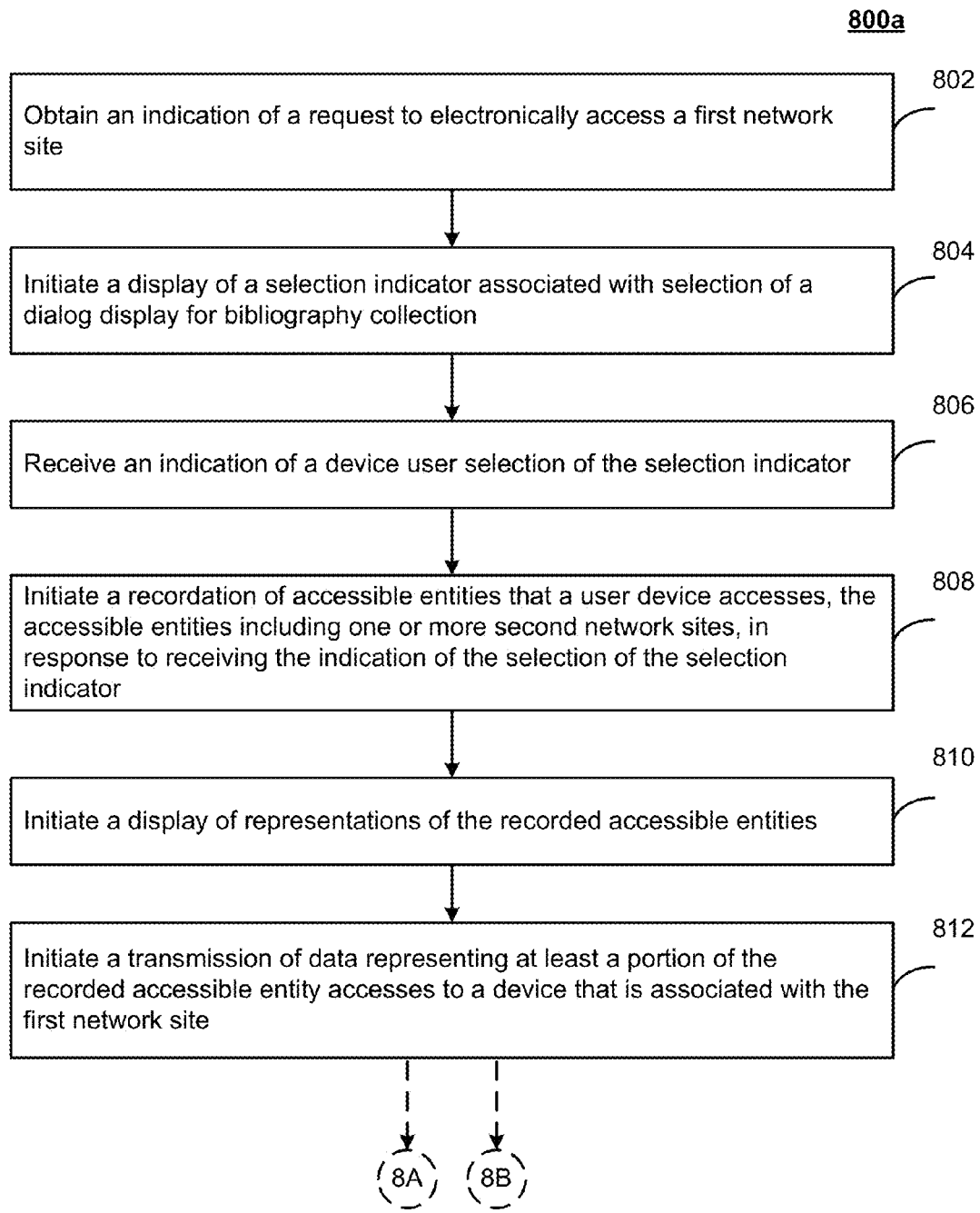
FIGS. 8a-8b are a flowchart illustrating example operations of the system of FIG. 1.

FIG. 8 is a flowchart illustrating example operations of the system of FIG. 1, according to example embodiments. In the example of FIG. 8*a*, an indication of a request to electronically access a first network site may be obtained (802). For example, the site access request component 108 may obtain the indication of the request 110 to electronically access the site 112, as discussed above.

A display of a selection indicator associated with selection of a dialog display for bibliography collection may be initiated (804). For example, the collection start indicator component 136 may initiate a display of a selection indicator 138 associated with selection of a dialog display for bibliography collection, as discussed above.

An indication of a device user selection of the selection indicator may be received (806). For example, the start indicator receiving component 140 may receive an indication of a device user selection of the selection indicator 138, as discussed above.

A recordation of accessible entities that a user device accesses may be initiated, the accessible entities including one or more second network sites, in response to receiving the indication of the selection of the selection indicator (808). For example, the recordation initiation component 142 may initiate a recordation of accessible entities 144 that a user device accesses, the accessible entities 144 including one or more network sites, in response to receiving the indication of the selection of the selection indicator 138, as discussed above.

A display of representations of the recorded accessible entities may be initiated (810). For example, the recorded entity display component 146 may initiate a display of representations 148 of the recorded accessible entities 144, as discussed above.

A transmission may be initiated, of data representing at least a portion of the recorded accessible entity accesses to a device that is associated with the first network site (812). For example, the recorded entity transmission component 150 may initiate a transmission of data representing at least a portion of the recorded accessible entity accesses to a device that is associated with the site 112, as discussed above.

Figure 8B:
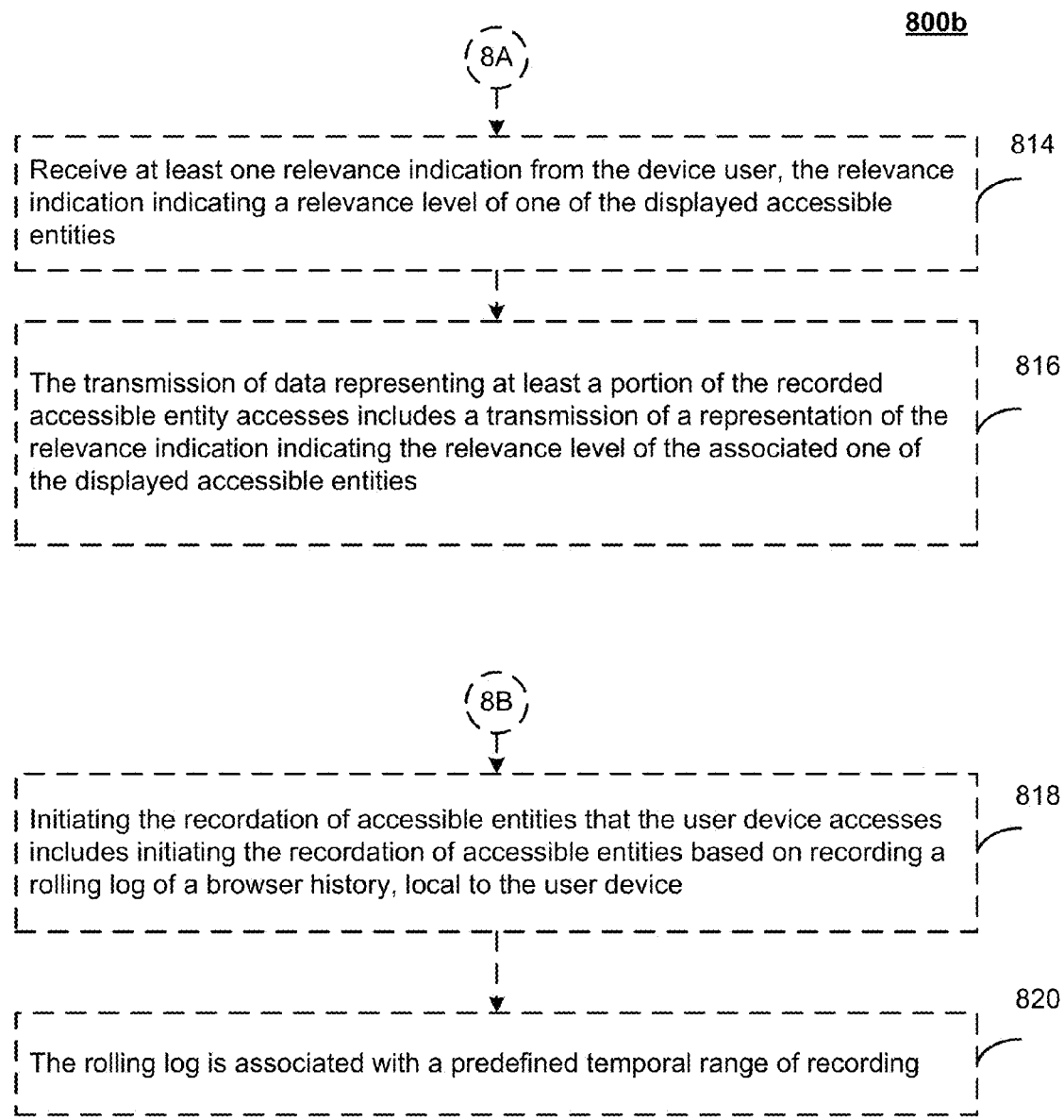

For example, at least one relevance indication may be received from the device user, the relevance indication indicating a relevance level of one of the displayed accessible entities (814), in the example of FIG. 8*b*. For example, the relevance indication acquisition component relevance indication acquisition component 152 may receive at least one relevance indication 154 from the device user, the relevance indication 154 indicating a relevance level of one of the displayed accessible entities 144, as discussed above.

For example, the transmission of data representing at least a portion of the recorded accessible entity accesses may include a transmission of a representation of the relevance indication indicating the relevance level of the associated one of the displayed accessible entities (816). For example, the recorded entity transmission component 150 may initiate the transmission of data representing at least a portion of the recorded accessible entity accesses, including a transmission of a representation of the relevance indication 154 indicating the relevance level of the associated one of the displayed accessible entities 144, as discussed above.

For example, initiating the recordation of accessible entities that the user device accesses may include initiating the recordation of accessible entities based on recording a rolling log of a browser history, local to the user device (818).

For example, the rolling log may be associated with a predefined temporal range of recording (820).

Figure 9A:
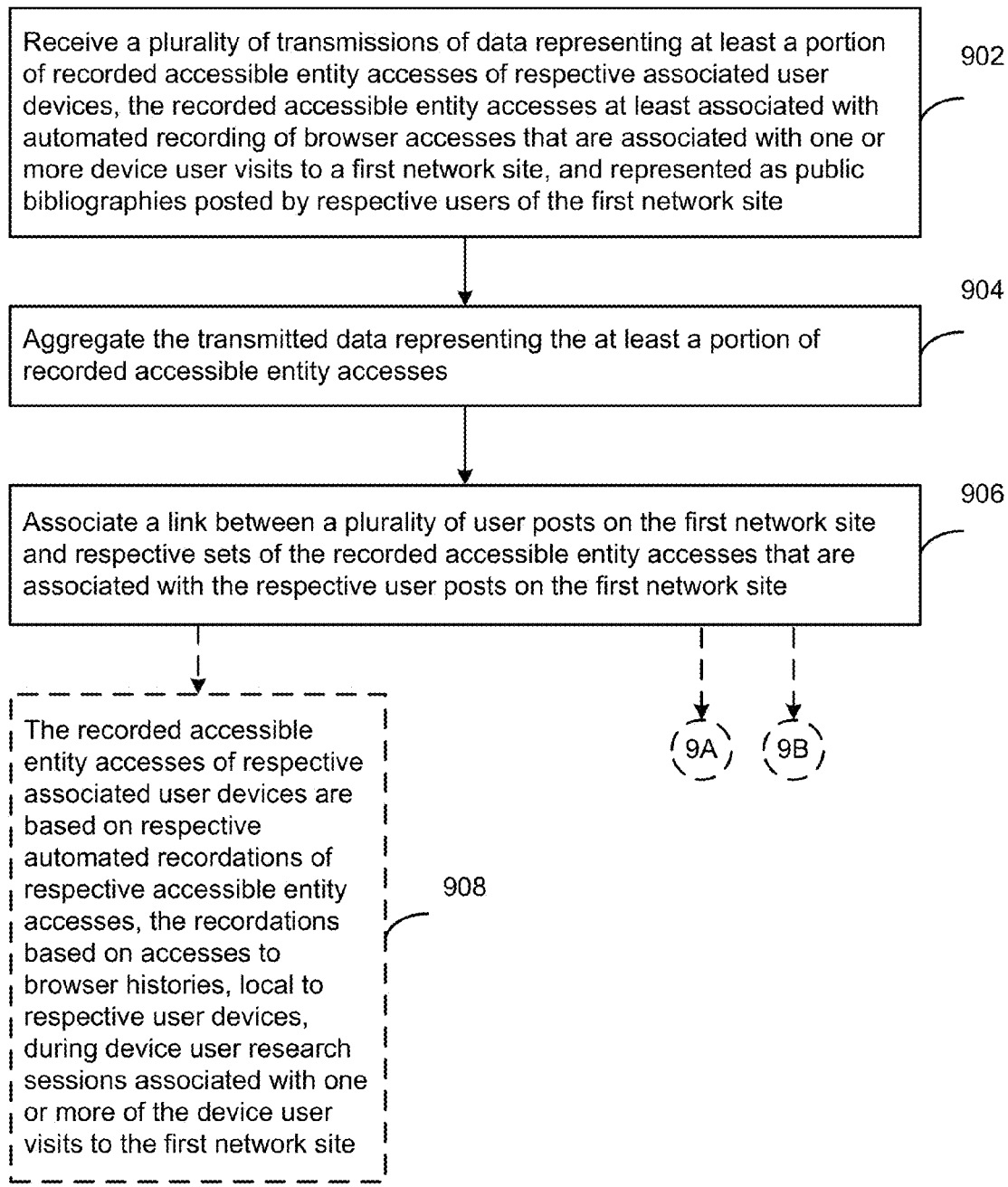

FIG. 9 is a flowchart illustrating example operations of the system of FIG. 1, according to example embodiments. In the example of FIG. 9*a*, a plurality of transmissions of data representing at least a portion of recorded accessible entity accesses of respective associated user devices may be received (902). The recorded accessible entity accesses may be at least associated with automated recording of browser accesses that are associated with one or more device user visits to a first network site, and represented as public bibliographies posted by respective users of the first network site.

The transmitted data representing the at least a portion of recorded accessible entity accesses may be aggregated (904).

A link may be associated between a plurality of user posts on the first network site and respective sets of the recorded accessible entity accesses that are associated with the respective user posts on the first network site (906).

For example, the recorded accessible entity accesses of respective associated user devices may be based on respective automated recordations of respective accessible entity accesses, the recordations based on accesses to browser histories, local to respective user devices, during device user research sessions associated with one or more of the device user visits to the first network site (908).

For example, a request may be received for a display of a bibliography associated with one of the user posts on the first network site (910), in the example of FIG. 9*b*.

For example, the display of the bibliography associated with one of the user posts on the first network site may be initiated, based on initiating a display of one or more of the respective sets of the recorded accessible entity accesses that are associated with the user post on the first network site that is associated with the request for a display of the bibliography (912).

For example, a display may be initiated of aggregate statistical information associated with the display of the bibliography associated with one of the user posts on the first network site (914).

For example, the aggregate statistical information may include one or more of a time spent in researching that is associated with each respective bibliography, a number of searches performed that is associated with each respective bibliography, or a list of web pages visited during the time spent in researching (916).

For example, a request may be received for a display of one or more bibliographies associated with a first network site user that is associated with one or more of the user posts on the first network site (918).

For example, a display of the one or more bibliographies associated with the first network site user may be initiated, the display including a display of public bibliographies associated with the first network site user, and one or more non-public bibliographies associated with the first network site user (920).

One skilled in the art of data processing will understand that there are many ways of generating bibliographies, without departing from the spirit of the discussion herein.

Customer privacy and confidentiality have been ongoing considerations in data processing environments for many years. Thus, example techniques discussed herein may use user input and/or data provided by users who have provided permission via one or more subscription agreements (e.g., "Terms of Service" (TOS) agreements) with associated applications or services associated with queries and forums. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a device that includes at least one processor, the device including a computer readable storage medium storing instructions for execution by the at least one processor, for implementing a bibliography collection engine that includes:
  a site access request component that obtains an indication of a request to electronically access a first network site for online user posting;
  a collection start indicator component that initiates a display of a selectable selection indicator associated with selection of a dialog display for bibliography collection, a web page that is associated with access to the first network site being altered by injection of the selectable selection indicator injected into the web page, the injecting performed locally to a user device requesting the access, the user device receiving the web page without the selectable selection indicator prior to the injecting, locally to the user device, of the selectable selection indicator, the first network site being hosted on one or more devices that are different from, and remote from, the user device;
  a start indicator receiving component that receives an indication of a device user selection of the selectable selection indicator;
  a recordation initiation component that initiates a recordation of accessible entities that the user device accesses, the accessible entities including one or more second network sites, in response to receiving the indication of the selection of the selectable selection indicator, the initiating the recordation including initiating recording, local to the user device, of a rolling log of a browser history;
  a recorded entity display component that initiates a display of representations of the recorded accessible entities; and
  a recorded entity transmission component that initiates a transmission of data representing at least a portion of the recorded accessible entity accesses to a device that is associated with the first network site.

2. The system of claim 1, further comprising:
a relevance indication acquisition component that receives at least one relevance indication from the device user, the relevance indication indicating a relevance level of one of the displayed accessible entities, wherein:
the recorded entity transmission component is configured to initiate the transmission of data representing at least a portion of the recorded accessible entity accesses, including a transmission of a representation of the relevance indication indicating the relevance level of the associated one of the displayed accessible entities.

3. The system of claim 2, further comprising:
a relevance assignment component that assigns a high relevance indication to respective recorded accessible entity accesses that are associated with a most recent web search, and with a most recent page visit, as a default assignment.

4. The system of claim 1, wherein:
obtaining the indication of the request includes obtaining the web page associated with access to the first network site, and
initiating the display of the selectable selection indicator associated with selection of a dialog display for bibliography collection includes initiating the display of a selectable graphical icon indicating a user selection to initiate bibliography collection associated with a researching session, based on inserting the selectable graphical icon in the obtained web page.

5. The system of claim 1, further comprising:
a selection element display component that initiates a display of selection elements for device user selections of relevance indications that are associated with each respective displayed accessible entity.

6. The system of claim 5, wherein:
the selection element display component is configured to initiate a display of redaction elements for device user selections of redaction indications that are associated with each respective displayed accessible entity, wherein the system further comprises:
a redaction selection acquisition component that receives one or more indicators indicating user selections of one or more of the redaction indications, from the device user; and
a redaction action component that initiates one or more redaction actions associated with respective displayed accessible entities that are associated with the received indicators indicating device user selections of one or more of the redaction indications, wherein
the transmission of data representing at least a portion of the recorded accessible entity accesses includes a transmission of the data, excluding at least the respective displayed accessible entities that are associated with the redaction actions.

7. The system of claim 1, wherein:
initiating the recordation of accessible entities that the user device accesses includes initiating the recordation of accessible entities based on recording the rolling log of the browser history, local to the user device, wherein the rolling log is associated with a predefined temporal range of recording.

8. The system of claim 1, wherein:
initiating the recordation of accessible entities that the user device accesses includes initiating the recordation of accessible entities when the device user initially accesses a question type of post on the first network site.

9. The system 1, further comprising:
a range adjustment request acquisition component that receives an indication from the device user of a request to adjust a range of the recorded accessible entity accesses; and a range adjustment action component that initiates an adjustment of the range of the recorded accessible entity accesses, in response to the request to adjust the range of the recorded accessible entity accesses, wherein:

the transmission of data representing at least a portion of the recorded accessible entity accesses includes a transmission of the data, excluding at least recorded accessible entity accesses that are external to the adjusted range.

10. The system of claim 9, wherein:

the indication from the device user of the request to adjust the range of the recorded accessible entity accesses includes one or more of:
- a dragging selection indication based on a device user dragging action in a selection area of a user interface, or
- a text selection indication based on a device user entry of text in a selection area of a user interface.

11. The system of claim 1, further comprising:

a format analysis acquisition component that obtains at least a portion of the recorded accessible entities, wherein each recorded accessible entity in the portion is represented in a first presentation format;

a format presentation analysis component that initiates an analysis of the recorded accessible entities in the portion to determine a second presentation format for a set of the recorded accessible entities in the portion, wherein:

initiating the display of representations of the recorded accessible entities includes initiating the display of the set of the recorded accessible entities in accordance with the second presentation format, wherein the second presentation format includes a summarized version of the first presentation format.

12. The system of claim 11, further comprising:

a format selection display component that initiates a display of selectable options indicating a long-form accessible entity representation and a compact form accessible entity representation, wherein:

initiating the display of the set of the recorded accessible entities in accordance with the second presentation format includes initiating the display of the set of the recorded accessible entities in accordance with the second presentation format in response to a device user selection of the option indicating the compact form accessible entity representation.

13. A method comprising:

obtaining an indication of a request to electronically access a first network site for online user posting;

receiving a web page that is associated with access to the first network site;

altering the web page that is associated with access to the first network site by injecting a selectable selection indicator into the web page, the injecting performed locally to a user device requesting the access, the user device receiving the web page without the selectable selection indicator prior to the injecting, locally to the user device, of the selectable selection indicator, the first network site being hosted on one or more devices that are different from, and remote from, the user device;

initiating, via a device processor, a display of the selectable selection indicator associated with selection of a dialog display for bibliography collection;

receiving an indication of a device user selection of the selectable selection indicator;

initiating a recordation of accessible entities that the user device accesses, the accessible entities including one or more second network sites, in response to receiving the indication of the selection of the selectable selection indicator, the initiating the recordation including initiating recording, local to the user device, of a rolling log of a browser history;

initiating a display of representations of the recorded accessible entities; and initiating a transmission of data representing at least a portion of the recorded accessible entity accesses to a device that is associated with the first network site.

14. The method of claim 13, further comprising:

receiving at least one relevance indication from the device user, the relevance indication indicating a relevance level of one of the displayed accessible entities, wherein:

the transmission of data representing at least a portion of the recorded accessible entity accesses includes a transmission of a representation of the relevance indication indicating the relevance level of the associated one of the displayed accessible entities.

15. The method of claim 13, wherein:

initiating the recordation of accessible entities that the user device accesses includes initiating the recordation of accessible entities based on recording the rolling log of the browser history, local to the user device, wherein the rolling log is associated with a predefined temporal range of recording.

16. A computer program product comprising a hardware computer-readable storage medium storing executable code that, when executed, causes at least one data processing apparatus to:

receive a plurality of transmissions of data representing at least a portion of recorded accessible entity accesses of respective associated user devices, the recorded accessible entity accesses at least associated with automated recording of browser accesses that are associated with one or more device user visits to a first network site for online user posting, and represented as public bibliographies posted by respective users of the first network site, the transmitted data including respective representations of respective locally recorded rolling logs of respective histories of the accessible entity accesses during the respective automated recording of respective browser accesses, with each respective recorded rolling log automatically recorded locally to each respective associated user device; and aggregate the transmitted data representing the at least a portion of recorded accessible entity accesses; and associate a link between a plurality of user posts on the first network site and respective sets of the recorded accessible entity accesses that are associated with the respective user posts on the first network site.

17. The computer program product of claim 16, wherein:

the recorded accessible entity accesses of respective associated user devices are based on respective automated recordations of respective accessible entity accesses, the recordations based on accesses to browser histories, local to respective user devices, during device user research sessions associated with one or more of the device user visits to the first network site.

18. The computer program product of claim 16, wherein the executable code, when executed, causes the at least one data processing apparatus to:

receive a request for a display of a bibliography associated with one of the user posts on the first network site; and initiate the display of the bibliography associated with one of the user posts on the first network site, based on initiating a display of one or more of the respective sets of the recorded accessible entity accesses that are associated with the user post on the first network site that is associated with the request for a display of the bibliography.

19. The computer program product of claim 18, wherein the executable code, when executed, causes the at least one data processing apparatus to:

initiate a display of aggregate statistical information associated with the display of the bibliography associated with one of the user posts on the first network site, wherein the aggregate statistical information includes one or more of:
- a time spent in researching that is associated with each respective bibliography,
- a number of searches performed that is associated with each respective bibliography, or
- a list of web pages visited during the time spent in researching.

20. The computer program product of claim 16, wherein the executable code, when executed, causes the at least one data processing apparatus to:

receive a request for a display of one or more bibliographies associated with a first network site user that is associated with one or more of the user posts on the first network site; and initiate a display of the one or more bibliographies associated with the first network site user, the display including a display of public bibliographies associated with the first network site user, and one or more non-public bibliographies associated with the first network site user.

* * * * *